United States Patent [19]

Proctor

[11] Patent Number: 4,524,924

[45] Date of Patent: Jun. 25, 1985

[54] SEAT BELT REEL

[76] Inventor: Ronald A. Proctor, "Sedbury", Woodham La., Woking, Surrey, England

[21] Appl. No.: 448,499

[22] Filed: Dec. 10, 1982

[30] Foreign Application Priority Data

Dec. 23, 1981 [GB] United Kingdom ................ 8138818
Feb. 26, 1982 [GB] United Kingdom ................ 8205662

[51] Int. Cl.³ ........................ A62B 35/02; B65H 75/48
[52] U.S. Cl. ........................ 242/107.4 A; 242/107.4 B
[58] Field of Search ................ 242/107.4 A, 107.4 B; 280/806; 297/478

[56] References Cited

U.S. PATENT DOCUMENTS 3,958,774 5/1976 Penzkofer et al. .......... 242/107.4 A
4,077,584 3/1978 Lafont ........................ 242/107.4 A
4,228,969 10/1980 Svensson ..................... 242/107.4 A
4,244,537 1/1981 Labeur ........................ 242/107.4 A Primary Examiner—John M. Jillions
Attorney, Agent, or Firm—Berman, Aisenberg & Platt

[57] ABSTRACT

A seat belt reel, retractor or other locking device adapted to be locked by the operation of an inertia member when the vehicle or aircraft in which it is fitted is suddenly subjected to an irregular movement, the said inertia member being carried by rotatable means which are coupled for rotation by locking means adapted to effect locking of the seat belt when rotation of the said locking means is prevented by the said rotatable means resulting from operation of the said inertia member caused by irregular movement of the said vehicle or aircraft.

10 Claims, 9 Drawing Figures

SEAT BELT REEL

This invention relates to a seat belt reel, retractor or other locking device having an inertia member which shifts its position in response to an irregular movement of the vehicle or aircraft in which the reel is fitted. Sometimes, as is well known in the art, the inertia member takes the form of a ball or other free-moving member, while in other cases it comprises a pendulum or lever. It is important therefore for the orientation of the reel casing in the vehicle or aircraft to be such that the inertia member does not move into its reel-locking position except when the vehicle or aircraft is suddenly braked or makes some other irregular movement. For this reason, it is impossible to arrange the casings of existing safety belt reels in more than just a limited range of positions in a vehicle or aircraft.

The aim of the present invention is to remove this problem.

Accordingly, the invention is directed to a seat belt reel, retractor or other locking device adapted to be locked by the operation of an inertia member when the vehicle or aircraft in which it is fitted is suddenly subjected to an irregular movement, the said inertia member being carried by rotatable means which are coupled for rotation by locking means adapted to effect locking of the seat belt when rotation of the said locking means is prevented by the said rotatable means resulting from operation of the said inertia member caused by irregular movement of the said vehicle or aircraft.

In a preferred form of the invention, the inertia member is movable to an upright or operating position by an adjustment of means supporting the inertia member irrespective of the position of the device throughout all planes. Alternatively, such adjustment may be available within a restricted range only of alternative positions for the device. If desired, the said supporting means can be lockable in any selected alternative position, locking means such as a grub screw being provided for this purpose.

Normally the inertia member will be carried in or on supporting means which are arranged for rotation through at least 120°—and preferably through 360°—in two planes at an angle to each other so as to permit the casing of the reel to be positioned at a desired orientation in a vehicle or aircraft, the two planes preferably being at 90° to each other.

In one particular seat belt reel, retractor or other locking device in accordance with the invention, the device comprises a flywheel which is movable from a free position where it permits the reel to operate for paying out a strap of the safety belt to a locked position wherein a shaft of the reel is locked to prevent further paying out of the strap, the reel having a part which rotates with the shaft and provides a reaction for the force which causes the flywheel to move axially to its locked position.

In the case where the inertia member is carried by supporting means which can be rotated through 360° in two planes at 90° to each other, the reel casing can be positioned at any orientation whatever in a vehicle or aircraft, it being a simple operation to adjust the said rotatable means either before or after the reel casing has been fastened in position so that the inertia member is in a position where it causes locking of the reel only when a strap of the belt is suddenly jerked or snatched or when the vehicle or aircraft makes an irregular movement.

Three examples of seat belt reels in accordance with the invention are shown in the accompanying drawings, in which FIG. 1 is a front view of one form of reel;

Figure 1:
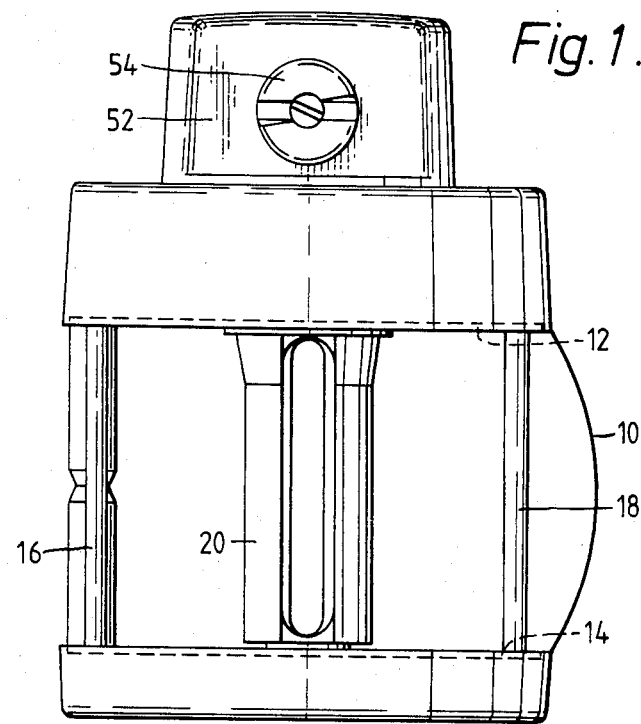
Figure 2:
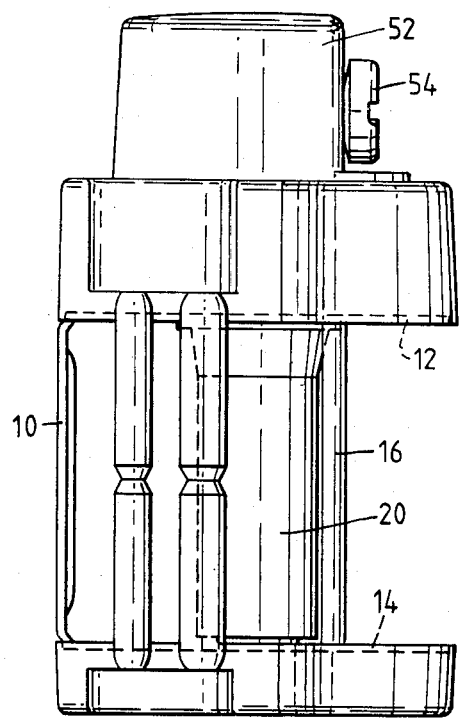
FIG. 2 is a side view of the reel shown in FIG. 1.
Figure 5:
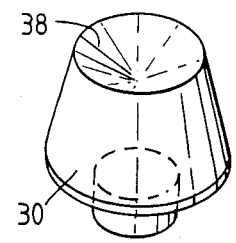
FIG. 5 is an enlarged perspective view of a detail of the reel shown in FIG. 1.

The seat belt reel shown in FIGS. 1–5 serves to allow a strap of the belt to be payed out from the reel so as to pass across the body of an occupant of a seat in a vehicle or aircraft. It comprises a channel section casing 10 having two opposed side walls 12 and 14 which are bridged by rods 16 and 18.

Rotatably supported by the casing 10 is a shaft 20 on which a strap 22 (see FIG. 4) is wound. As the strap is unwound, the shaft 20 rotates and will not normally resist such movement of the strap. Carried on the shaft 20 is a frusto-conical flywheel 24 which is a rotatable member urged by helical spring 25 surrounding the shaft into a free position (that shown in the drawings) where it permits the reel to operate for paying-out a strap of the belt. The flywheel is, however, movable axially along the shaft into a locked position in which the shaft 20 is locked against rotation and this prevents any further paying-out of the strap. Such locking is effected by means of a stationary toothed ring 26 on the casing 10 towards which the flywheel 24 can be forced so that teeth 28 on the lowermost portion of the flywheel 24 engage the teeth of the ring 26.

Engagement between the flywheel 24 and the toothed ring 26 is brought about by a change in position of a frusto-conical metal inertia member 30 (see FIGS. 3 and 5) which is carried or otherwise supported for relatively free movement in a cup-like compartment in a generally cylindrical carrier 32 the axis of which lies substantially at right angles to the axis of the shaft and flywheel. The carrier 32 is provided with a lever or pawl 34 pivoted at 35 and having a cam surface 36 which is forced upwards by a surface 38 on the inertia member 30 when the vehicle or aircraft makes an irregular movement. The device is also belt-sensitive since the flywheel 24 will move to engage teeth 26 when the belt is suddenly jerked or snatched. Such movement of the pawl or lever 34 will cause its nose portion 40 to enter any one of a number of parallel slots 42 extending longitudinally in a cylindrical rotatable carrier or sleeve 44 which encircles the cylindrical carrier 32. At one end of the rotatable carrier or sleeve 44 there is a toothed ring or pinion 46 the teeth of which engage a ring 48 of corresponding teeth formed on the upper end of the flywheel 24. Ring 46 and 48 thus form coupling members. It thus follows that the entry of the nose portion 40 of the pawl or lever 34 into one of the slots 42 prevents rotation of the toothed ring 46 and also of the toothed ring 48. The result of this is that any further paying-out movement of the strap 22 of the belt will be resisted. At the same time, the tension on the strap, on meeting such resistance, will cause cam surfaces 50 on the upper end of the shaft 20, to come out of corresponding recesses in the upper surface 51 of the flywheel 24 which is rotatable relatively to the shaft and is still momentarily rotating, and to ride on that upper surface 51 in such a way as to displace the flywheel axially of the shaft 20 so that its teeth 28 engage the stationary toothed ring 26. The flywheel too is now locked against rotation.

In order that the inertia member 30 may always be in the correct position for proper operation of the reel notwithstanding the orientation of the casing 10 in the vehicle or aircraft, the carrier 32 for the inertia member is arranged for adjustment by rotation through 360° on a cup-shaped casing 52 which surrounds it. Rotation of the carrier 32 is effected by means of a knob 54. The carrier 32 for the inertia member 30 is therefore rotatable through 360° in one particular plane.

In addition to this, the supporting means for the inertia member are so devised that they and/or parts associated therewith can also be rotated through 360° in another plane at 90° to the first plane. For this purpose, the casing 52 is rotatably supported on a peripheral portion of the ring 26. Rotation of the casing 52 will therefore cause the carrier 32 to be rotated in a plane at right-angles to the plane in which it is itself rotated when the knob 54 is turned.

The construction shown in FIGS. 1–5 therefore provides a simple and effective means whereby the supporting means for an inertia member in a safety belt reel can be rotated through 360° in two planes at right-angles to each other so as to bring the supporting means into the correct position for effective operation of the reel irrespective of the orientation of the casing in a vehicle or aircraft.

Figure 6:
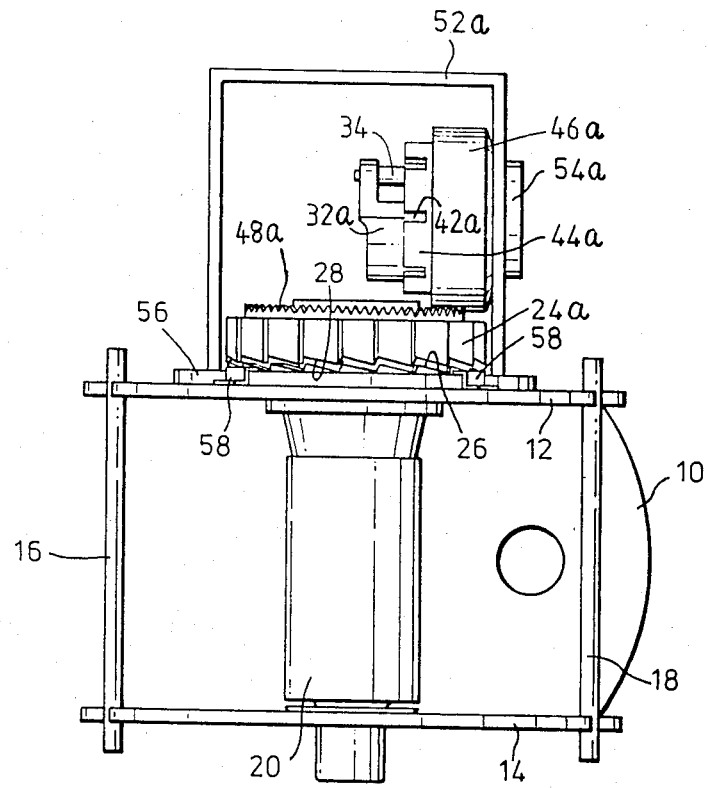
FIG. 6 is a side view of another form of reel.
Figure 8:
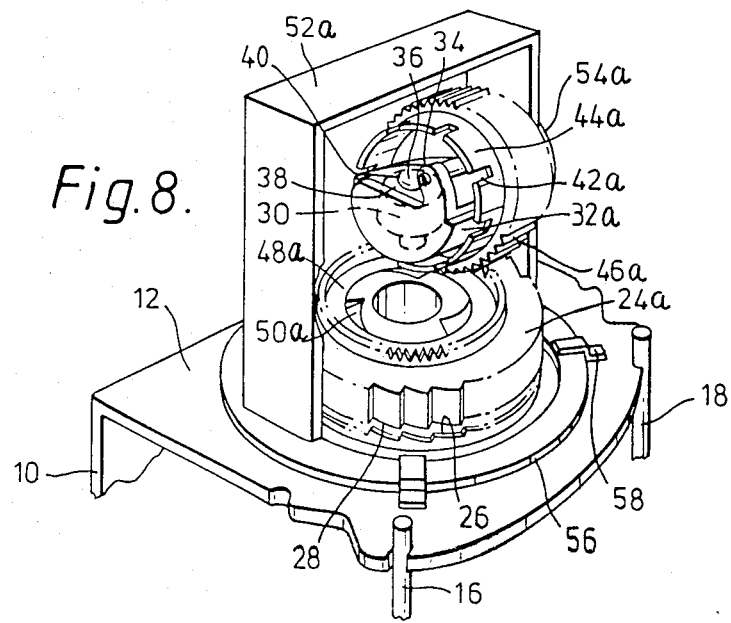
FIG. 8 is another perspective view of the reel shown in FIG. 6.
Figure 7:
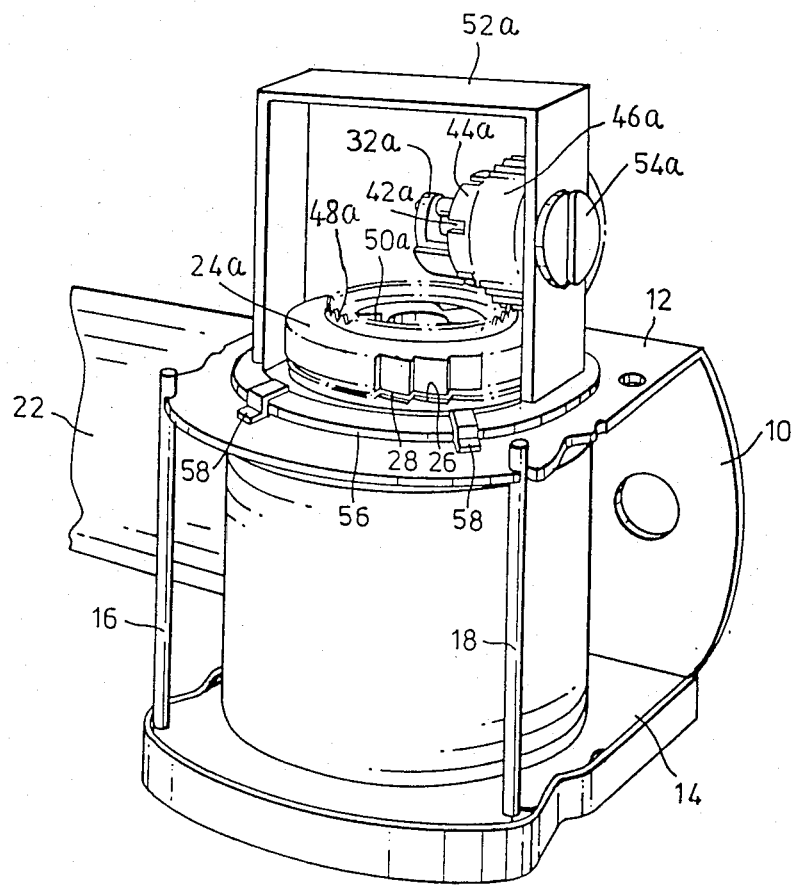
FIG. 7 is a perspective view of the reel shown in FIG. 6.

FIGS. 6–8 show another form of seat belt reel in accordance with the invention. This also comprises a channel section casing 10 having two opposed side walls 12 and 14 which are bridged by rods 16 and 18.

Rotatably supported by the casing 10 in FIGS. 6–8 is a shaft 20 on which a strap 22 is wound. As the strap is unwound, the shaft 20 rotates and will not normally resist such movement of the strap. Carried on the shaft 20 is a spring-loaded flywheel 24a which is movable axially along the shaft against the action of the spring 45 from a free position (that shown in the drawings) where it permits the reel to operate for paying-out a strap of the belt to a locked position in which the shaft 20 is locked against rotation and this prevents any further paying-out of the strap. Such locking is effected by means of a stationary toothed ring 26 on the casing 10 towards which the flywheel 24a can be forced so that teeth 28 on the lowermost portion of the flywheel 24a engage the teeth of the ring 26.

Engagement between the flywheel 24a and the toothed ring 26 is brought about by a change in position of an inertia member 30 (see FIG. 3) which is carried for relatively free movement in a cup-like carrier 32a the axis of which is substantially at right-angles to the axis of the shaft and flywheel. The carrier 32a is provided with a lever or pawl 34 having a cam surface 36 which is forced upwards, as shown in FIG. 8, by a surface 38 on the inertia member 30 when the vehicle or aircraft makes an irregular movement. Such movement of the pawl or lever 34 will cause its nose portion 40 to enter any one of a number of parallel slots 42a provided around the periphery of rotatable carrier or sleeve 44a encircling the carrier 32a. On the outside of the rotatable carrier 44a there is a toothed ring or pinion 46a the teeth of which engage corresponding teeth on a toothed ring 48a lying concentrically within the flywheel 24a. It thus follows that the entry of the nose portion 40 of the pawl or lever 34 into one of the slots 42a prevents rotation of the toothed ring 46a and also of the toothed ring 48a. The result of this is that any further paying-out movement of the strap of the belt will be resisted. At the same time, the tension on the strap, on meeting such resistance, will cause corresponding cam surfaces 50a on the toothed ring 48a and the shaft 20 to displace the toothed ring 48 axially in the same way as described in connection with FIGS. 1 to 5. Such displacement causes the flywheel 24a to be likewise displaced axially of the shaft 20 so as to engage the toothed ring 26. The outer cylindrical surface of the toothed ring 48a is in frictional engagement with the inner cylindrical surface of the flywheel 24a, the friction being variable by means of a grub screw which passes through the flywheel 24a.

In order that the inertia member 30 may always be in the correct position for proper operation of the reel notwithstanding the orientation of the casing 10 in the vehicle or aircraft, the carrier 32a for the inertia member is arranged for adjustment by rotation through 360° on an inverted U-shaped bracket 52a. Rotation of the container is effected by means of a knob 54a. The carrier 32 for the inertia member 30 is therefore rotatable through 360° in one particular plane.

In addition to this, the supporting means for the inertia member are so devised that they can also be rotated through 360° in another plane at 90° to the first plane. For this purpose, the inverted U-shaped bracket 52a is carried on a rotatable ring 56 which is held in position on the wall 12 of the casing 10 by suitable retaining means 58. Rotation of the ring 56 will therefore cause the carrier 32a to be rotated in a plane at right-angles to the plane in which it is itself rotated when the knob 54a is turned.

Figure 9:
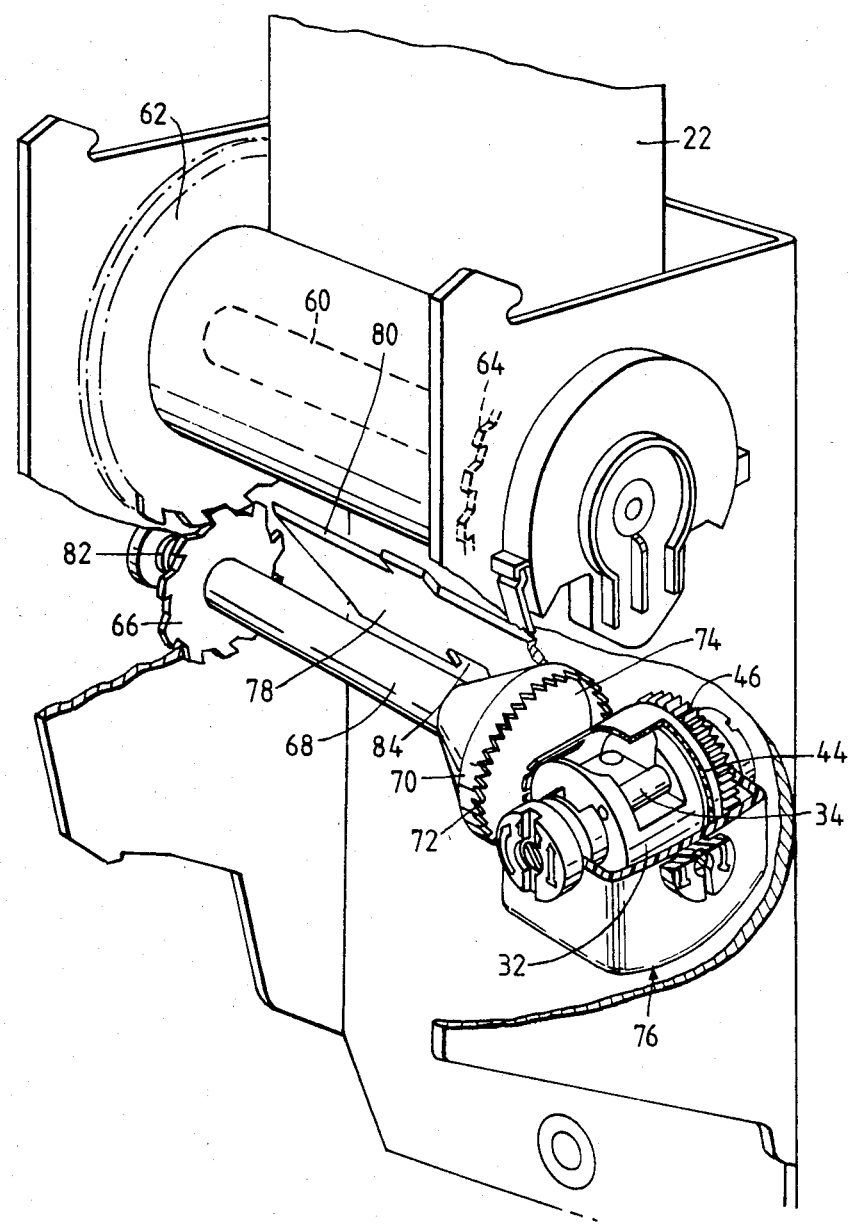
FIG. 9 is a perspective view of a third form of reel.

FIG. 9 shows a third form of seat belt reel in accordance with the invention, this particular construction having a so-called "cotton-reel" style retractor of the kind favoured in the United States of America. It comprises a shaft 60 on which a strap 22 is wound and a pair of ratchet wheels 62 and 64, one at each end of the shaft. The teeth on one or both of these ratchet wheels (in this instance, the wheel 62) are adapted to engage a toothed wheel 66 carried on one end of a stub-shaft 68 lying substantially parallel to the main reel shaft 60 and arranged for limited axial displacement. On the other end of the stub-shaft 68 there is a frusto-conical pinion 70 provided with a toothed ring 72 on its larger end-surface 74. The teeth of this ring 72 are arranged to engage the toothed ring 46 of an assembly 76 which is of the same construction as that shown above the toothed ring 48 in FIG. 3. In other words, the assembly 76 comprises an inertia member carried in a carrier 32 provided with a lever or pawl 34, the carrier 32 being surrounded by a cylindrical container or sleeve 44 having a toothed ring 46.

For the purpose of locking the shaft 60 of the reel against rotation, a locking plate 78 is mounted for pivotal movement (about an axis lying parallel to the shaft 60) into and out of a position where its edge 80 engages one or both of the ratchet wheels 62 and 64.

During normal use of the reel, the toothed wheel 66 is held in mesh with the ratchet wheel 62 by means of a spring 82 which acts on the wheel 66 axially of the stub shaft 68. If now the vehicle or aircraft in which the reel is installed undergoes an irregular movement, the inertia member lifts the lever or pawl 34 in exactly the same way as described in connection with FIGS. 1-5 so as to stop any rotation of the toothed ring 46. This, in turn, causes the frusto-conical member 70, the stub-shaft 68 and the toothed wheel 66 to be shifted to the left against the action of the spring 82 in the same manner as is flywheel 24 in FIG. 3, thus bringing the conical surface of the pinion 70 into engagement with a part 84 of the locking plate 78. The locking plate 78 is thereby swung about its pivotal axis into a position where its edge 80 engages the ratchet wheel 62 and stops rotation of the main reel shaft 60.

Figure 3:
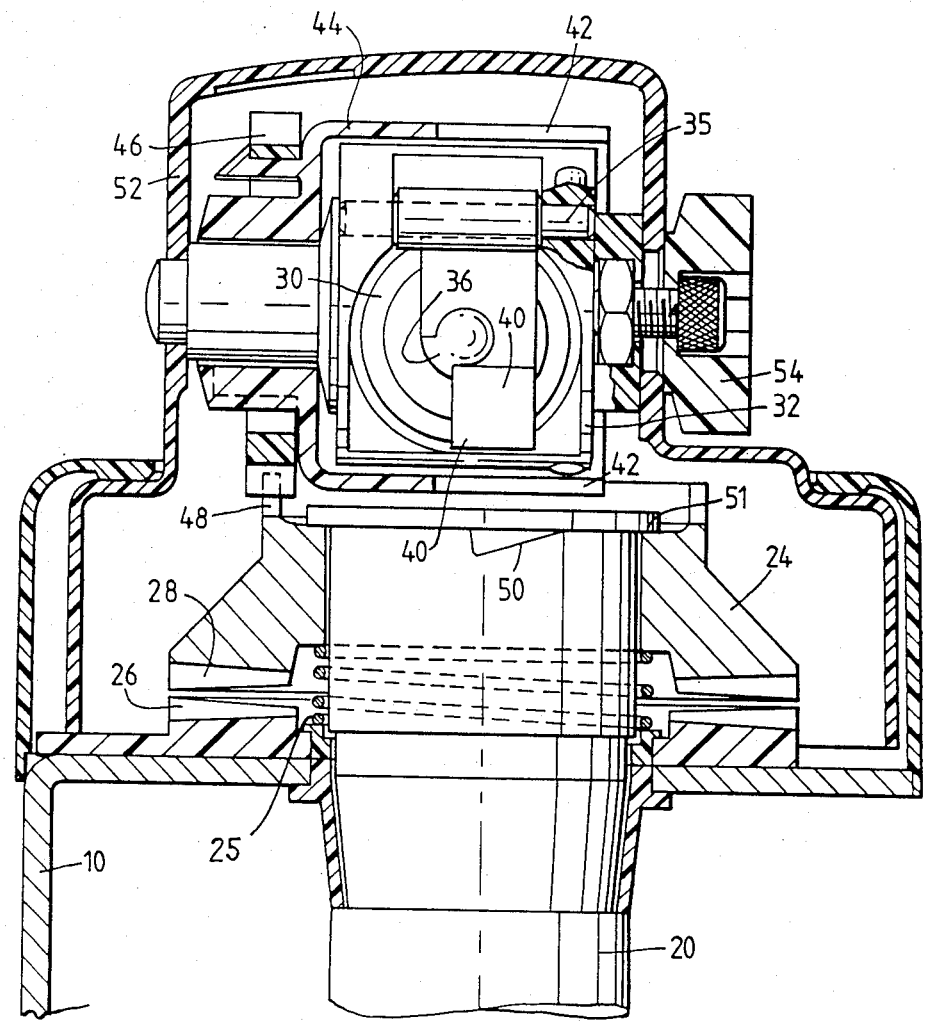
FIG. 3 is an enlarged section through part of the reel shown in FIGS. 1 and 2.
Figure 4:
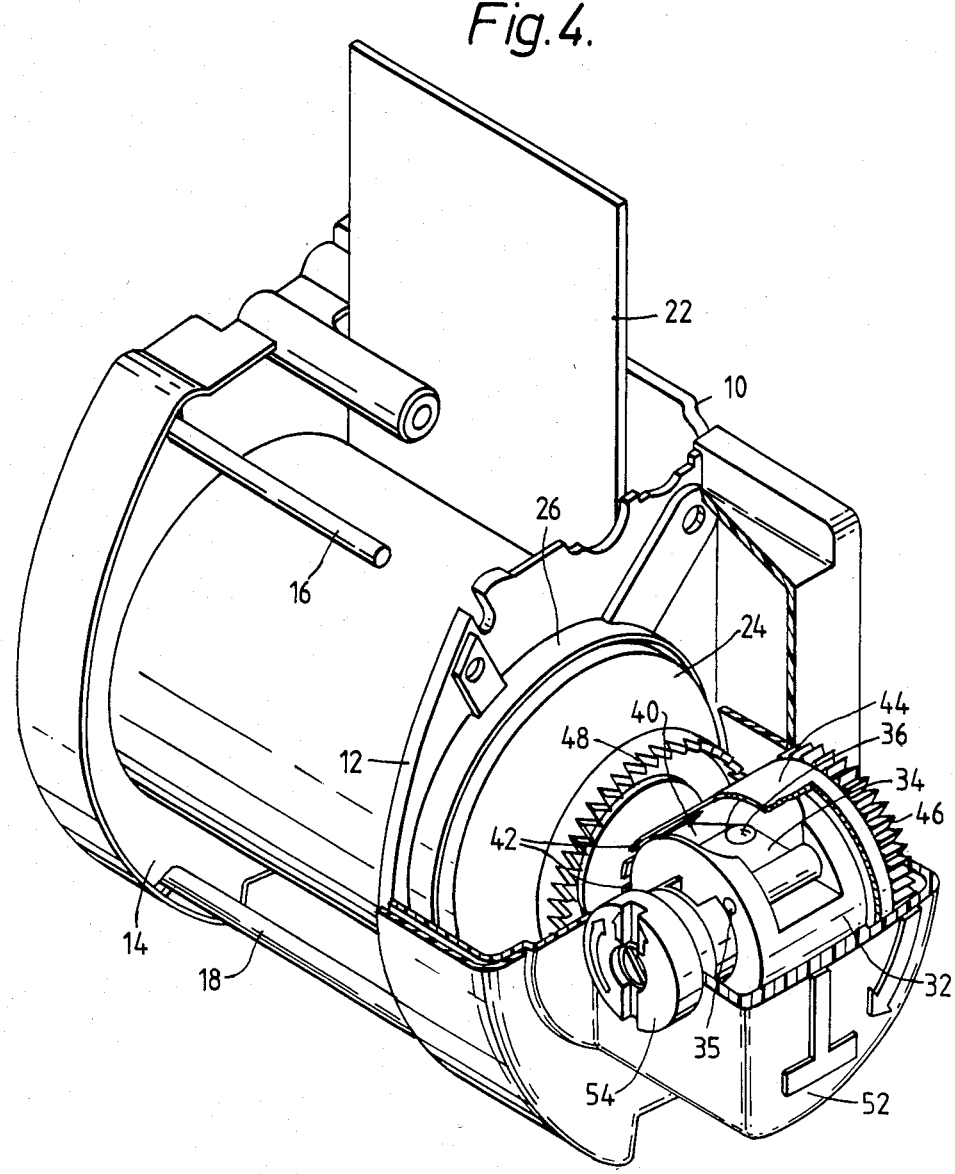
FIG. 4 is a perspective view of the reel shown in FIG. 1.

As with the reels shown in FIGS. 1-8, the assembly 76 allows the inertia member to be correctly positioned by the same adjustment means as shown in FIGS. 3 and 4, notwithstanding the orientation of the reel in a vehicle or aircraft.

Although the three constructions shown in the drawings each provide for rotation of the means supporting the inertia member through 360° in two planes at 90° to each other, it is not essential in all instances for 360° rotation to be provided in each plane. For example, where a seat belt reel is made to the requirements of a particular customer who will install the reels in a limited range of alternative positions within a vehicle or aircraft, adjustment of the means supporting the inertia member can be restricted to a predetermined range of alternative positions. This may mean that rotation in one plane can be limited to, say, 270°, or 180° or even as little as 120°. The same can apply to rotation in the other plane as well.

In addition, there may be other instances in which a customer orders a batch of seat belt reels knowing that they will be installed in a particular make of vehicle in a predetermined position of orientation. In that case, the customer may well wish to lock the means supporting the inertia member in a particular position of adjustment before each reel is installed, the said locking of the means supporting the inertia member being effected either by the customer or by the manufacture. In other words, the seat belt reel will be provided with locking means so that, after installation of each seat belt reel, the means supporting the inertia member will no longer be adjustable by, say, the owner of a vehicle in which such reels have been installed.

I claim:

1. A seat belt reel comprising:
   (a) a casing adapted to be mounted in transportation means;
   (b) a reel shaft rotatably carried on said casing with a strap of said belt being wound on said reel shaft;
   (c) locking means operatively associated with said reel shaft to lock said reel shaft against rotation, said locking means including a rotatable member;
   (d) coupling means coupling said rotatable member of said locking means with rotatable carrier means mounted for rotation with said rotatable member;
   (e) an inertia member adapted to move when said transportation means is subjected to an irregular movement, said inertia member being carried in said rotatable carrier means; and
   (f) an element associated with said inertia member and responsive to movement thereof to prevent rotation of said rotatable carrier means whereby said rotatable member of said locking means is also prevented from rotating and thus locks the reel shaft against rotation.

2. A seat belt reel according to claim 1, wherein said rotatable carrier means and said reel shaft rotate about respective axes at right angles to each other.

3. A seat belt reel according to claim 1, wherein said rotatable member of said locking means comprises a toothed flywheel which is arranged to engage a stationary part of said locking means when rotation of said rotatable member is prevented by said rotatable carrier means.

4. A seat belt reel according to claim 3, wherein said flywheel is movable axially of the reel shaft from a free position where it permits the reel shaft to rotate for paying out the strap wound thereon to a locked position where said flywheel engages said stationary part.

5. A seat belt reel according to claim 4, wherein said flywheel is urged by a spring into the said free position but moves against the action of said spring into the said locked position when the belt is jerked.

6. A seat belt reel according to claim 1, wherein said coupling means comprise a toothed pinion provided on the outside of said rotatable carrier means, and, in engagement therewith, a ring of teeth on the rotatable member of said locking means.

7. A seat belt reel comprising:
   (a) a casing rotatably carried on said casing means;
   (b) a reel shaft rotatably carried on said casing with a strap of said belt being wound on said reel shaft;
   (c) rotation-transmission means connecting said reel shaft to rotatable carrier means;
   (d) an inertia member carried by support means in said rotatable carrier means, said inertia member being movable in response to irregular movements of said transportation means; and
   (e) mounting means on said casing for said inertia member support means, said inertia member support means being mounted for rotation through an angle of at least 120° for adjustment purposes on said support means, and said mounting means being mounted for rotation through an angle of at least 120° for adjustment purposes on said casing.

8. A seat belt reel according to claim 7, wherein rotation of said inertia member support means is about an axis at an angle to the axis of rotation of said mounting means.

9. A seat belt reel according to claim 8, wherein said support means and said mounting means are each arranged for rotation through 360°, the said rotations being in two planes at an angle to each other so as to permit the casing of the reel to be positioned at any desired orientation in said transportation means.

10. A seat belt reel according to claim 8, wherein said inertia member support means and said mounting means are rotatable in two planes at right angles to each other.

* * * * *